(12) United States Patent
Dickstein et al.

(10) Patent No.: US 7,426,420 B2
(45) Date of Patent: Sep. 16, 2008

(54) SYSTEM FOR DISPATCHING SEMICONDUCTORS LOTS

(75) Inventors: Eric Ted Dickstein, Gardiner, NY (US); Alan Dziedzic, Newburgh, NY (US); Richard Gerard Burda, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/307,288

(22) Filed: Jan. 31, 2006

(65) Prior Publication Data

US 2006/0282187 A1 Dec. 14, 2006

(51) Int. Cl.
*G06F 19/00* (2006.01)
(52) U.S. Cl. .................. 700/110; 700/19; 702/182; 707/102; 709/107; 710/1
(58) Field of Classification Search .............. 700/17, 700/19, 108, 110; 702/182; 707/102; 709/107; 710/1
See application file for complete search history.

(56) References Cited

U.S. PATENT DOCUMENTS

| | | | |
|---|---|---|---|
| 5,548,535 A * | 8/1996 | Zvonar | 702/81 |
| 6,128,588 A * | 10/2000 | Chacon | 703/6 |
| 6,308,107 B1 | 10/2001 | Conboy et al. | |
| 6,622,059 B1 * | 9/2003 | Toprac et al. | 700/121 |
| 6,647,307 B1 | 11/2003 | Huang et al. | |
| 6,684,121 B1 * | 1/2004 | Lu et al. | 700/108 |
| 6,687,563 B1 | 2/2004 | Wang et al. | |
| 6,748,287 B1 * | 6/2004 | Hagen et al. | 700/99 |
| 6,819,963 B2 * | 11/2004 | Riley et al. | 700/29 |
| 7,043,321 B2 * | 5/2006 | Ruml et al. | 700/100 |

* cited by examiner

*Primary Examiner*—Leo Picard
*Assistant Examiner*—Douglas S. Lee
(74) *Attorney, Agent, or Firm*—Ohlandt, Greeley, Ruggiero & Perle, L.L.P.; Steven Capella, Esq.

(57) ABSTRACT

A system for dispatching a plurality of semiconductor lots among a plurality of tools is provided. The system includes a dispatch server manager and a dispatch integrator and display device. The dispatch integrator and display device conveys a dispatch request to the manager and receives a dispatch list from the manager. The manager queries for a processing status of the plurality of semiconductor lots and displays a dispatch list in response to the processing status. The dispatch list includes an associated reason and/or code related to the processing status.

22 Claims, 4 Drawing Sheets

| 410 | 420 | 430 | 440 | 450 | 460 |
|---|---|---|---|---|---|
| KA01 | 04490KSM002.000 | 21Dec2004.09:36:23 | 1304 | Invalid FOUP xfer state | 00000000000027702,BO |
| KA01 | 04448M4P367.000 | 21Dec2004.09:50:18 | 1101 | Previously Reserved | KAD1-20041221-0037 |
| KA01 | 04521SM9001.000 | 21Dec2004.09:50:18 | 1101 | Previously Reserved | KAD2-20041221-0031 |
| KA01 | 04179EHS001.003 | 21Dec2004.09:50:18 | 1300 | FOUP Reserved | |
| KA01 | 04481SMA009.001 | 21Dec2004.09:50:18 | 1304 | Invalid FOUP xfer state | 00000000000013261,EI |
| KA01 | 04330KAI273.000 | 21Dec2004.09:50:18 | 1304 | Invalid FOUP xfer state | 00000000000007207,BO |
| KA01 | 04388M4P332.000 | 21Dec2004.09:50:18 | 1304 | Invalid FOUP xfer state | 00000000000013635,SO |
| KA01 | 04400KAI183.000 | 21Dec2004.09:50:18 | 1304 | Invalid FOUP xfer state | 00000000000047691,EO |
| KA01 | 04400KAI185.000 | 21Dec2004.09:50:18 | 1304 | Invalid FOUP xfer state | 00000000000025521,SO |
| KA01 | 04421SEK008.000 | 21Dec2004.09:50:18 | 1304 | Invalid FOUP xfer state | 00000000000048969,SO |
| KA01 | 04420KAI220.000 | 21Dec2004.09:50:18 | 1304 | Invalid FOUP xfer state | 00000000000026529,BO |
| KA01 | 04438M41016.000 | 21Dec2004.09:50:18 | 1304 | Invalid FOUP xfer state | 00000000000008244,EI |
| KA01 | 04501SEK003.000 | 21Dec2004.09:50:18 | 1304 | Invalid FOUP xfer state | 00000000000001478,BO |
| KA01 | 04500KAI088.000 | 21Dec2004.09:50:18 | 1304 | Invalid FOUP xfer state | 00000000000025388,BO |
| KA01 | 04421SEKO08.000 | 21Dec2004.09:52:52 | 1101 | Previously Reserved | KA07-20041221-0031 |
| KA01 | 04448M4P367.000 | 21Dec2004.09:52:52 | 1101 | Previously Reserved | KAD1-20041221-0037 |
| KA01 | 04501SEK003.000 | 21Dec2004.09:52:52 | 1101 | Previously Reserved | KA03-20041221-0033 |
| KA01 | 04521SM9001.000 | 21Dec2004.09:52:52 | 1101 | Previously Reserved | KAD2-20041221-0031 |
| KA01 | 04179EHS001.003 | 21Dec2004.09:52:52 | 1300 | FOUP Reserved | |
| KA01 | 04481SMA009.001 | 21Dec2004.09:52:52 | 1301 | FOUP NOT AVAILABLE | 13261 |
| KA01 | 04330KAI273.000 | 21Dec2004.09:52:52 | 1304 | Invalid FOUP xfer state | 00000000000007207,BO |
| KA01 | 04400KAI185.000 | 21Dec2004.09:52:52 | 1304 | Invalid FOUP xfer state | 00000000000025521,BO |
| KA01 | 04420KAI220.000 | 21Dec2004.09:52:52 | 1304 | Invalid FOUP xfer state | 00000000000026529,SO |
| KA01 | 04438M41016.000 | 21Dec2004.09:52:52 | 1304 | Invalid FOUP xfer state | 00000000000008244,SO |
| KA01 | 04500KAI088.000 | 21Dec2004.09:52:52 | 1304 | Invalid FOUP xfer state | 00000000000025388,SO |

Fig. 4

SYSTEM FOR DISPATCHING SEMICONDUCTORS LOTS

BACKGROUND OF INVENTION

The present disclosure relates to the dispatching of lots in semiconductor processing. More particularly, the present disclosure relates to displaying, for review by an operator, the dispatching logic of semiconductor processing tools.

In semiconductor fabrication, each semiconductor is formed as part of a lot or group of semiconductors (hereinafter "lot"). The semiconductor lot is processed by a number of differing processing tools.

The scheduling or dispatching of the semiconductor lots to the processing tools is a dynamic process. For instance, conditions can change in the manufacturing process, the raw materials, the processing tools, and other variables, which leads to a need for dynamic dispatching of the semiconductor lots to the processing tools.

Each processing tool performs a specific manufacturing process to the semiconductor lot in accordance with one or more process rules. The process rules are enforced by a service manager, commonly referred to as a real time dispatch service manager or "manager". The service manager is an automated system that makes decisions regarding the appropriate dispatching steps to take, for instance, which tool a particular lot should be conveyed. Also, the service manager takes into account override conditions or filters that have been input by operators.

The service manager applies the dispatching rules based on the operational characteristics of each tool and how it relates to a given lot. The dispatching rules can remove lots from a dispatching list, (i.e., a listing of lots to be processed by tools) for many reasons. These reasons include tool setup optimization, waiting for batch logic updates, or compensating for work-in-progress (WIP) balancing requirements across the manager.

In some cases, the dispatching rules and/or filters deliberately keep lots from being processed, thereby keeping the tools idle for some time. However, there is no way for the user/operator of a tool to know if a tool with an empty dispatch list is idle by design, or if there is something that should be done to make one or more lots dispatchable at the tool.

Visibility to the logic of the dispatching rules is not available in real-time, as the service manager has been optimized for rapid execution of the dispatching rules. Understanding the reason a lot cannot be dispatched is important to fabrication operation, as once the reasons are understood, it can then be known what can be done to make an idle lot available and to better utilize the tools.

Thus, it has been determined by the present application that a need exists for a real time display to show the status of dispatched lots with explanation codes.

BRIEF DESCRIPTION OF THE INVENTION

A system for dispatching a plurality of semiconductor lots among a plurality of tools is provided. The system includes a dispatch server manager and a dispatch integrator and display device. The dispatch integrator and display device conveys a dispatch request to the manager and receives a dispatch list from the manager. The manager queries for a processing status of the plurality of semiconductor lots and displays a dispatch list in response to the processing status. The dispatch list includes an associated reason and/or code related to the processing status.

A system for dispatching a plurality of semiconductor lots among a plurality of tools is also provided that includes a dispatch integrator and display, a dispatch service manager, and an explain infrastructure. The dispatch service manager dispatches the plurality of semiconductor lots to a plurality of dispatchers. The dispatch service manager is in electrical communication with the dispatch integrator and display. The explain infrastructure is in communication with the dispatch service manager. The explain infrastructure exports information from the dispatch service manager to the dispatch integrator and display. The information include a dispatch state of the plurality of semiconductor lots.

A method of processing a semiconductor lot is also provided. The method includes programming a dispatch server manager with a filter, controlling the dispatch server manager to determine whether to dispatch the semiconductor lot among at least one of a plurality of dispatchers as a function of the filter, and controlling the dispatch server manager to output a reason code within a predetermined timeframe if the dispatch server manager does not dispatch the semiconductor lot.

The invention also encompasses computer program products stored in a computer-readable medium, the program products comprising computer-executable code for performing the methods of the invention. The invention also encompasses methods of deploying the computer program products of the invention in a computing system.

These and other aspects of the invention are described in further detail below.

BRIEF DESCRIPTION OF THE DRAWINGS

FIG. 4 illustrates an exemplary embodiment of an output table according to the present disclosure.

DETAILED DESCRIPTION OF THE INVENTION

Figure 1:
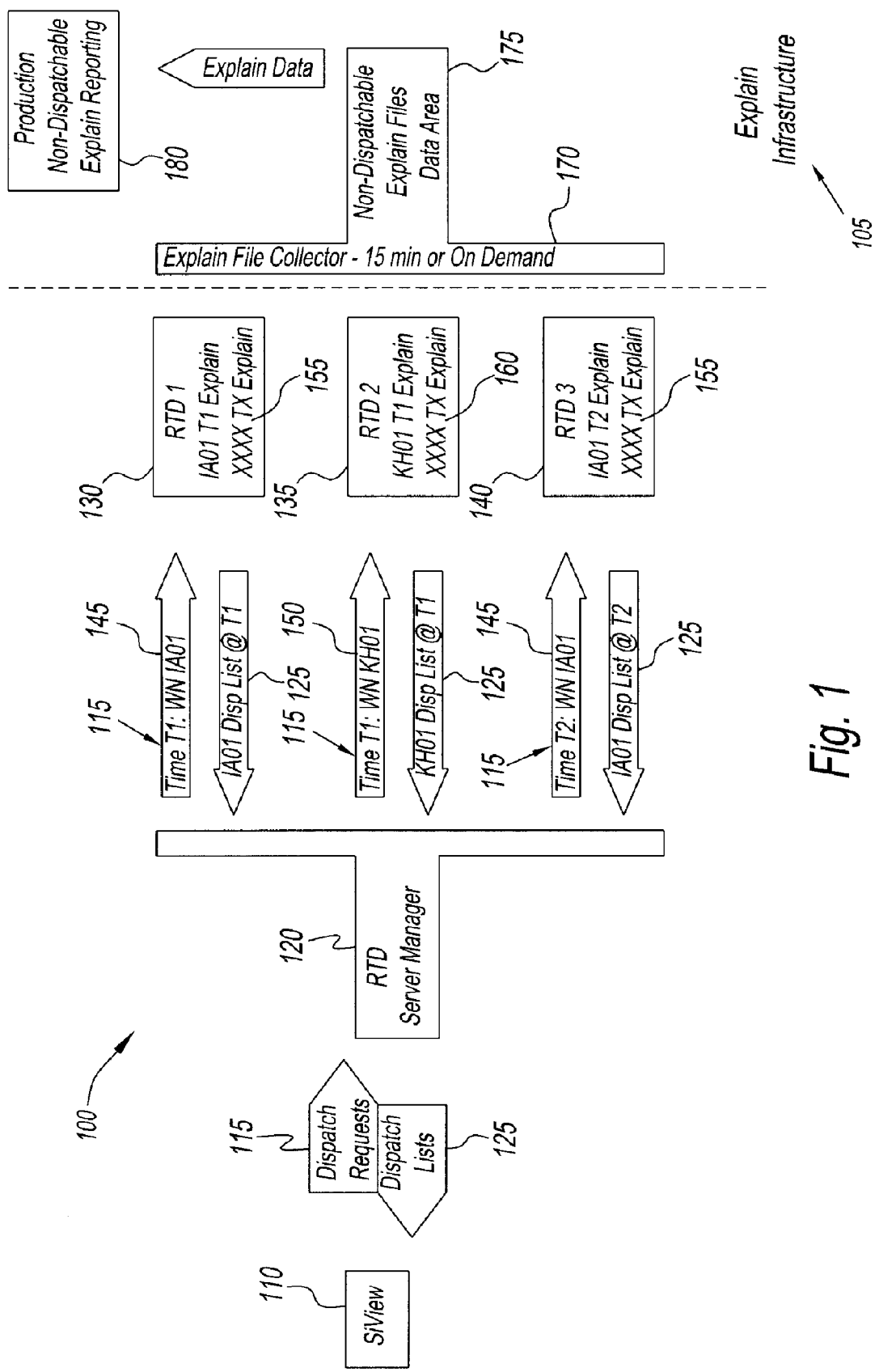
FIG. 1 illustrates an exemplary embodiment of a system according to the present disclosure.

Referring to the drawings and in particular to FIG. 1, an exemplary embodiment of a system for dispatching semiconductors lots ("system 100") is illustrated. Advantageously, system 100 includes an explain infrastructure 105 that generates for display to the operator, in real time, the status of dispatched lots with explanation codes as to this status. Thus, system 100 allows the user to correct and/or override rules within the system to improve manufacturing throughput.

System 100 includes a dispatch integrator and display device 110 ("device" 110) that conveys dispatch requests 115 to a real time dispatch server manager 120 ("manager" 120). Dispatch requests 115 contain a list of proposed lots to be dispatched by manager 120 to various tools for processing. Manager 120 manages the dispatch requests 115 to divide them among a plurality of dispatchers 130, 135, 140. Specifically, manager 120 sends dispatch requests 115 to dispatchers 130, 135, 140, which processes the dispatch requests from device 110. In addition, manager 120 conveys dispatch lists 125 back to device 110 that have been calculated by dispatchers 130, 135, 140. Dispatch lists 125 contain a listing of actual lots that are either currently being controlled for processing by various dispatchers 130, 135, 140.

Manager 120, dispatch requests 115, queries dispatchers 130, 135 and 140 for status reports as to what the processing status is of the various lots at dispatchers 130, 135 and 140. In the illustrated embodiment, manager 120 queries for status reports at a first time 145 and a second time 150 regarding a first lot 155 and a second lot 160.

In response to the dispatch requests 115, system 100 returns dispatch lists 125, to manager 120 at their allotted times, which conveys the processing status of these lots. Dispatch lists 125 include the processing status states of lots 155, 160 at the respective times 145, 150 and whether the particular lot is being processed. Service manager 120 aggregates dispatch lists 125 and conveys the aggregated dispatch lists 125 to device 110.

Advantageously, device 180 displays dispatch lists 125 with an associated reason and/or explain codes as to why a particular lot 155, 160, at a particular dispatcher 130, 135, 140 has not been dispatched for processing by manager 120. This reason code can either be that dispatcher 130, 135, 140 may have sensed an error condition in a lot which is conveyed to manager 120, and manager 120 stops dispatching the lot, or alternatively manager 120 has independently determined not to dispatch a lot or lots to dispatcher 130, 135, 140 based upon dispatch logic, including filters.

Thus, system 100 includes explain infrastructure 105 coupled to manager 120. Infrastructure 105 includes a file collector 170 and an explain file 175. File collector 170 collects decisions, about real time dispatching for various lots 155, 160 and makes this accessible to device 110. In other words, collector 170 collects the reasons why a particular lot may not be dispatching, as determined at manager 120, and saves this information into a separate file (i.e., explain file 175). In some embodiments, explain file 175 also includes associated sensor readings with the reasons.

Infrastructure 105 exports explain file 175, in real time, via an explain reporting exit 180, which is exported to the operator via, for example, device 110. Real time may be generally defined as allowing for the interaction of a user with manager 120 during the manufacturing process of a lot on a particular tool. In other words, through use of system 100, explanation codes as to why lots at dispatchers 130, 135, 140 are not dispatching (i.e., explain file 175) are conveyed to production non-dispatchable explain reporting 180, thereby allowing an operator to perform real-time determinations of whether there is a problem, and if so, to take appropriate action through reprogramming rules in manager 120.

Figure 2:
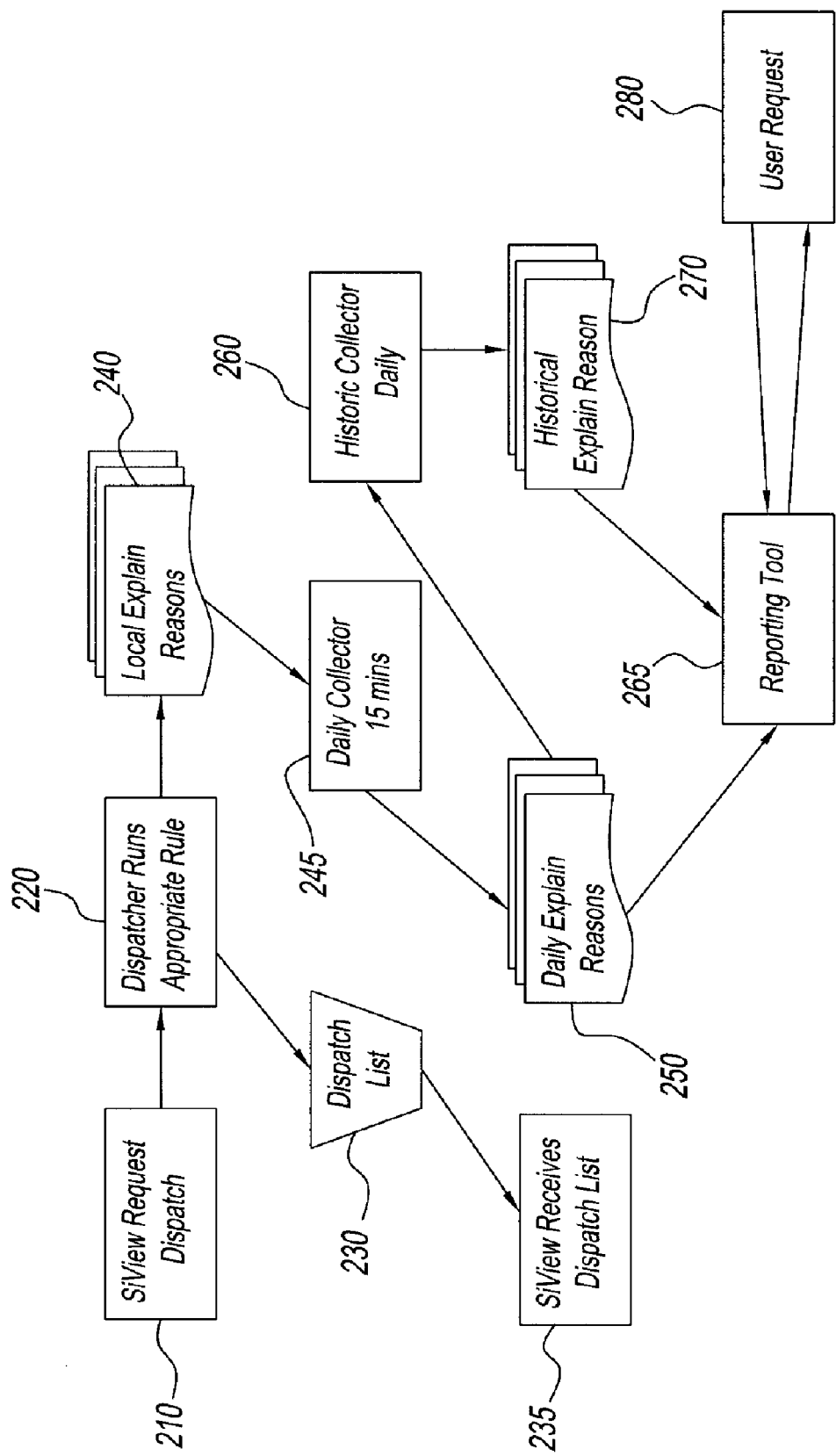
FIG. 2 is a method for a real-time non-dispatchable lot explanation according to the present disclosure.

FIG. 2 illustrates a method 200 that shows the parallel flows of non-explanation dispatch information and real-time explanation code dispatch information.

In step 210, device 110 requests various lots to be dispatched as dispatch request 115. Method 200 advances to step 220. In step 220, manager 120 runs the appropriate rule. In other words, a rule is run for a lot or lots, and the "dispatching" i.e., the timing and the order of the processing, and the types of processing, of the lots that have not been filtered out is determined. Method 200 advances to step 230 and step 240 in parallel.

In step 230, dispatch lists 125 are generated by manager 120. Dispatch lists 125 display the lots that are actually going to be processed, the order, and so on as determined by manager 120 based upon information from dispatchers 130, 135, 140. However, dispatch lists 125 do not list any lots that were requested in dispatch request 210 but not actually dispatched by manager 120, such as for the reasons that a given lot was filtered out by a filter. Method 200 advances to step 235.

In step 235, device 110 receives dispatch lists 125, but dispatch lists 125 can not be accessed in real time. Instead, a log is kept within device 110, and an operator must review it manually to determine which lots are dispatching, and therefore, by the process of elimination, which lots are not dispatching. Furthermore, the lots that are not dispatching do not have a reason code attached that explains why they are not dispatching.

Advantageously, in step 240, corresponding reasons that various lots are not dispatching are collected. Method 200 advances to step 245.

In step 245, explain collector 170 stores the explanation codes collected in step 240. The explanation codes comprise explanations as to why various lots are not dispatching or are delayed from dispatching as determined by manager 120, such as being filtered out by an installed filter. In one embodiment, explain collector 170 collects explanation codes every 15 minutes, upon demand. Alternatively, the explanation codes can be harvested on some other timing sequence as selected by an operator. Method 200 advances to step 250.

In step 250, in any event, collector 170 stores all the explanation codes in a file for a manufacturing "day". This can be a 24-hour time period, a shift, or some other time period. The daily reporting (or 15 minute reporting, or the on-demand reporting, as collected in steps 240 and 245) start a further parallel process. These reasons are conveyed both to both a historical collector daily file in step 260, and production non-dispatchable explain reporting 180 in step 265.

Alternatively, in step 270, historical non-dispatchable explanation reasons are stored in a file, and made accessible by non-dispatchable explain reporting tool 180.

In step 280, an operator/user requests real time information, or is otherwise provided with periodic updates on lot processing formalities. The user/operator is then provided with explanation codes as to why various lots are not processing.

Figure 3:
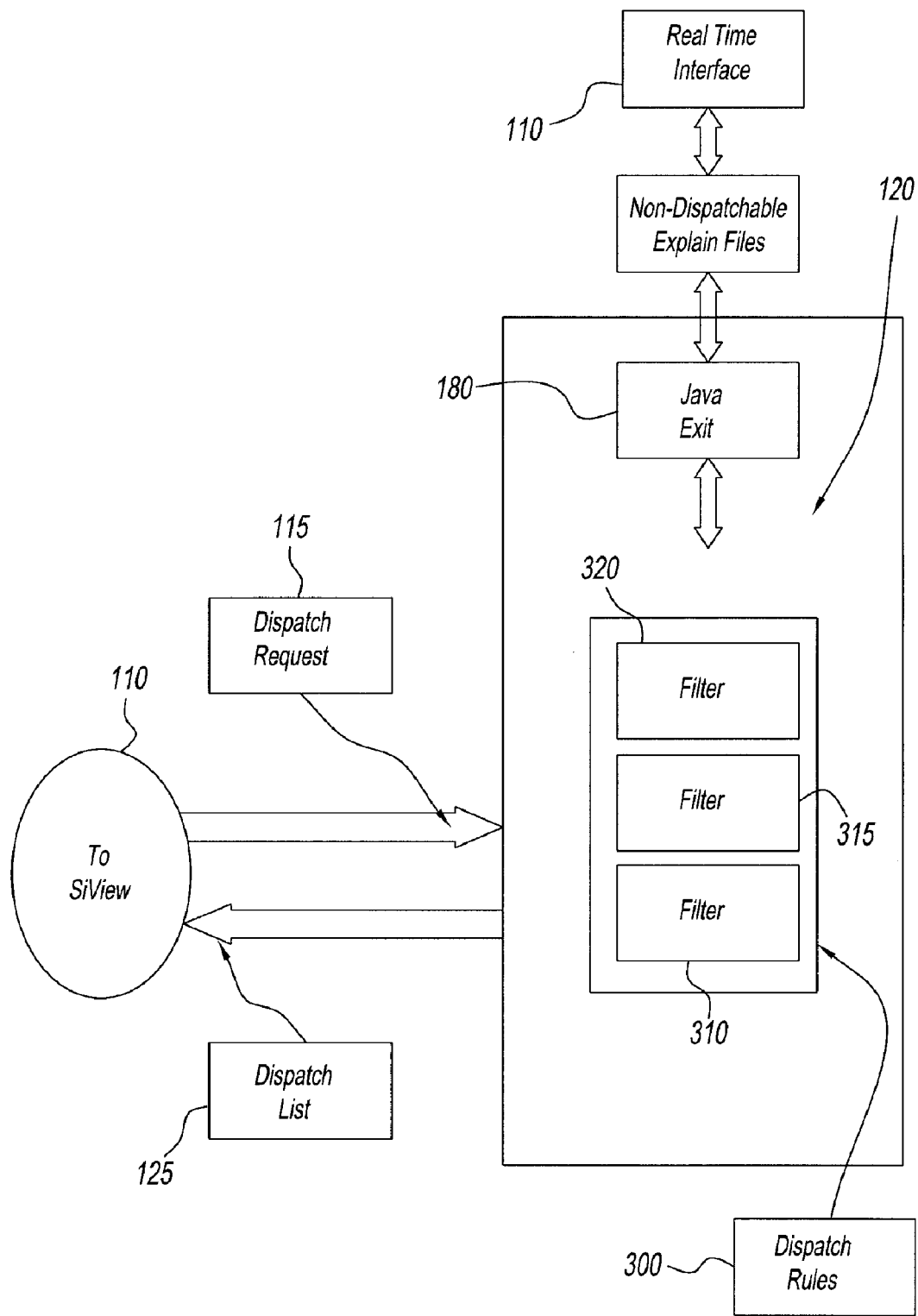
FIG. 3 illustrates an exemplary embodiment of a dispatch server manager according to the present disclosure.

FIG. 3 illustrates manager 120 in more detail. Manager 120 includes one or more dispatch rules 300 stored in the manager as one or more filters 310, 315, 320. Manager 120 is in communication with explain reporting exit 180, which can be, for example, an exit programmed in JAVA. Reporting exit 180 is coupled to a display such as, but not limited to device 110.

Reporting exit 180 is an "exit portal" in code or firmware that can be used by manager 120 to export information. Advantageously, manager 120 uses exit 180 to convey the information that will be contained within non-dispatchable explain files 175 to device 110. Therefore, after performing a user request step 280, a user/operator can view lots made un-dispatchable by filters 310, 315, 320 via device 110. This information can them be used by the user to take action in the factory to improve performance.

FIG. 4 illustrates a table 400 of information available at device 110 as it pertains to explanation codes as contained within non-dispatchable explain reporting 180. Table 400 can include information such as, but not limited to, a dispatch tool identifier column 410, a lot identifier column 420, a time of dispatch column 430, an explain code column 440, an explain reason column 450, a lot detail column 460, and any combinations thereof.

Advantageously, explain infrastructure 105 cooperates with manager 120 to allow the user to see, in real-time, what the specific reasons that a lot and/or real time dispatch tool is not functioning. This enables user/operator to make the appropriate adjustments.

The systems of the invention preferably include one or more computers and/or microprocessors associated with the components of the system for embodying one or more aspects of the system.

The invention also encompasses computer program products stored in a computer-readable medium for carrying out the method(s) of the invention. For example, the invention encompasses computer program products having computer-executable code for processing a semiconductor lot by:

programming a dispatch server manager with a filter;

controlling the dispatch server manager to determine whether to dispatch the semiconductor lot among at least one of a plurality of dispatchers as a function of the filter; and controlling the dispatch server manager to output a reason code within a predetermined timeframe if the dispatch server manager does not dispatch the semiconductor lot.

Preferably, the computer program product further includes computer-executable code for controlling the dispatch server manager to output the reason code to a display.

Preferably, the computer program product further includes computer-executable code for allowing user evaluation of the reason code and for user alteration of the filter as a function of the reason code. The alteration may be include deleting the filter.

Preferably, the computer program product further includes computer-executable code allowing the reason code to comprise data selected from the group consisting of dispatch tool identifier information, lot identifier information, time of dispatch information, explain code information, explain reason information, lot detail information, and any combinations thereof.

Preferably, the computer program product further includes computer-executable code for receiving dispatch requests at the dispatch server manager and code for storing the reason codes in a file before outputting the reason code by the dispatch server manager to the output device.

The computer program products of the invention may be deployed in a computer system (e.g. by installation of code in a memory device of the system). The computer system may be part of a manufacturing tool and/or encompass part of a manufacturing tool. The computing system may include multiple computers, multiple manufacturing tools, remote computers, portable computer-readable media, etc.).

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A system for dispatching a plurality of semiconductor lots among a plurality of tools, the system comprising:

a dispatch server manager; and a dispatch integrator and display device for conveying a dispatch request to said manager and receiving a dispatch list from said manager, wherein said manager queries for a processing status of said plurality of semiconductor lots and displays a dispatch list in response to said processing status, wherein said dispatch list includes an associated reason and/or code related to said processing status, wherein said reason and/or code enables the viewing of the cause of specific delays in real time, and enables differentiation between deliberate processing delays and malfunctions, and wherein adjustment in the system are executed based on said reason and/or code.

2. The system of claim 1, further comprising an explain infrastructure coupled to said manager, said explain infrastructure comprising a file collector that collects decisions from said manager about said processing status.

3. The system of claim 2, wherein said file collector saves said associated reason and/or code in an explain file.

4. The system of claim 3, wherein said explain file comprises sensor readings of the plurality of tools.

5. The system of claim 3, wherein said explain infrastructure exports said explain file to said dispatch integrator and display device via an explain reporting exit.

6. The system of claim 5, wherein said explain reporting exit comprises a JAVA programmed exit.

7. The system of claim 3, wherein said explain file comprises data selected from the group consisting of dispatch tool identifier information, lot identifier information, time of dispatch information, explain code information, explain reason information, lot detail information, and any combinations thereof.

8. The system of claim 1, wherein said adjustments enables a user to correct and/or override rules within the system to improve manufacturing throughput.

9. The system of claim 1, wherein said adjustments include reprogramming rules in said manager.

10. A system for dispatching a plurality of semiconductor lots, the system comprising:

a dispatch integrator and display;

a dispatch service manager for dispatching the plurality of semiconductor lots to a plurality of dispatchers, said dispatch service manager being in electrical communication with said dispatch integrator and display;

an explain infrastructure in communication with said dispatch service manager, said explain infrastructure exporting information from said dispatch service manager to said dispatch integrator and display, said information including a dispatch state of the plurality of semiconductor lots; and a user input for updating said dispatch service manager as a function of said information.

11. The system of claim 10, wherein said information comprises data selected from the group consisting of dispatch tool identifier information, lot identifier information, time of dispatch information, explain code information, explain reason information, lot detail information, and any combinations thereof.

12. A method of processing a semiconductor lot, comprising:

programming a dispatch server manager with a filter;

controlling said dispatch server manager to determine whether to dispatch the semiconductor lot among at least one of a plurality of dispatchers as a function of said filter;

controlling said dispatch server manager to output a reason code within a predetermined timeframe if said dispatch server manager does not dispatch the semiconductor lot;

evaluating said reason code by a user; and altering said filter as a function of said reason code by said user.

13. The method of claim 12, further comprising controlling said dispatch server manager to output said reason code to a display.

14. The method of claim 12, wherein said reason code comprises data selected from the group consisting of dispatch tool identifier information, lot identifier information, time of dispatch information, explain code information, explain reason information, lot detail information, and any combinations thereof.

15. The method of claim 12, further comprising receiving dispatch requests at said dispatch server manager.

16. The method of claim 12, further comprising storing said reason codes in a file before outputting said reason code by said dispatch server manager to said output device.

17. A computer program product in a computer-readable medium, said program product comprising computer-executable code for performing a method of processing a semiconductor lot, said method comprising:
  programming a dispatch server manager with a filter;
  controlling said dispatch server manager to determine whether to dispatch the semiconductor lot among at least one of a plurality of dispatchers as a function of said filter;
  controlling said dispatch server manager to output a reason code within a predetermined timeframe if said dispatch server manager does not dispatch the semiconductor lot;
  evaluating said reason code; and
  altering said filter as a function of said reason code.

18. The computer program product of claim 17, further comprising computer-executable code for controlling said dispatch server manager to output said reason code to a display.

19. The computer program product of claim 18, further comprising computer-executable code for allowing the reason code to comprise data selected from the group consisting of dispatch tool identifier information, lot identifier information, time of dispatch information, explain code information, explain reason information, lot detail information, and any combinations thereof.

20. The computer program product of claim 18, further comprising computer-executable code for receiving dispatch requests at said dispatch server manager.

21. The computer program product of claim 18, further comprising computer-executable code for storing said reason codes in a file before outputting said reason code by said dispatch server manager to said output device.

22. A method for deploying computing infrastructure, comprising integrating computer-executable code into a computing system, wherein the code in combination with the computing system is capable of performing a method of processing a semiconductor lot, said method comprising:
  programming a dispatch server manager with a filter;
  controlling said dispatch server manager to determine whether to dispatch the semiconductor lot among at least one of a plurality of dispatchers as a function of said filter; and
  controlling said dispatch server manager to output a reason code within a predetermined timeframe if said dispatch server manager does not dispatch the semiconductor lot;
  evaluating said reason code; and
  altering said filter as a function of said reason code.

* * * * *